United States Patent Office 3,097,246
Patented July 9, 1963

3,097,246
NOVEL TELOMERIZATION REACTION
Dimitrios V. Favis, Sarnia, Ontario, Canada, assignor to Esso Research and Engineering Company, a corporation of Delaware
No Drawing. Filed Nov. 16, 1960, Ser. No. 69,548
8 Claims. (Cl. 260—671)

This invention relates to telomerization reaction and more particularly to the telomerization reaction between ethylene and an aromatic hydrocarbon.

It was found by N. A. McCall and H. W. Coover (U.S. Patent 2,824,145) that ethylene could be polymerized with an aromatic hydrocarbon such as benzene or toluene using as catalyst $EtAlX_2/TiCl_4$, where X is a halogen, preferably bromine, having a molar ratio less than 1 to form alkylated aromatics. It was found, however, that the yields of alkylated aromatics suitable as lubricating oils were low because of the formation of large quantities of waxy or solid products.

It has now been found that the preparation of polyalkylated aromatic hydrocarbons suitable as lubricating oils can be prepared in high yield by reacting ethylene with an aromatic hydrocarbon in the presence of a 3-component catalyst containing at least (1) an alkyl compound of a metal of groups I to III of the periodic table; (2) a halide of a transition metal of groups IV–B, V–B, VI–B and VIII of the periodic table, and (3) an alkylhalocycloalkane, preferably alkylhalocyclopentane, in an inert diluent. It is critical that the quantity of alkylhalocyclopentane be less than one mole per mole of alkyl radical of the above alkyl compound.

The aromatic hydrocarbon starting material of the invention has the general formula:

$$Ar(R)_x$$

wherein: Ar is a mono- or polyring aromatic nucleus of either fused or benzenoid type such as benzene, diphenyl, naphthalene, anthracene and the like; R is a straight or branched alkyl or cycloalkyl group which is saturated or unsaturated; $x=0$ to 9, preferably 0 to 1, depending partly on the number of rings in the aromatic nucleus, and is chosen such that at least one free position remains on the aromatic nucleus. The unsubstituted or mono-substituted aromatics such as benzene and toluene are preferred due to their cheapness. When $x$ is more than one, the R groups can be the same or different, and can be spaced in any relationship to each other; and with polyring aromatics the R groups can be all on the same ring or spaced in any relationship to each other on two or more rings. In addition to aromatics of the above general formula, polyaromatic methanes can be employed such as for example biphenylmethane and triphenylmethane.

The products prepared by the process of the invention are mixtures of alkylated aromatics wherein the starting aromatic or alkylaromatic compounds are substituted with one or more alkyl groups up to and including substitution on every available position on the aromatic nucleus. The alkyl groups attached to the aromatic nucleus by the instant reaction are substantially all straight chain alkyl groups having from about 2 to 20 carbon atoms.

The metal alkyl components of the catalysts of the invention have the following general formula:

$$[CH_3-(CH_2)_m]_n MeX_p$$

where
$m=0$ to 23, preferably 0 to 1;
$n=1$ to 3;
$Me=$a metal of groups I to III of the periodic table such as Li, Na, K, Mg, Ca, Sr, Ba, Al, Ga, and In; with Al preferred;
$X=$a halogen chosen from I, Br, and Cl; and
$p=0$ to 2 depending on the value of $n$ and the valence of Me.

The preferred compound is triethyl aluminum although diethyl aluminum chloride has also been found to be highly advantageous.

The metal halide component of the catalysts of the invention have the following general formula:

$$MX_a$$

where
$M=$a transition metal of groups IV–B, V–B, VI–B, and VIII of the periodic system such as Ti, Zr, V, Cr, Mo, W, and Fe, preferably Ti;
$X=$a halide, preferably Cl; and
$a=2$ to 4

The preferred compound is titanium tetrachloride.

The third component of the catalyst is an alkylhalocyclopentane having the formula:

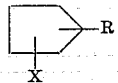

where
$R=$a straight or branched chain alkyl group having from 1 to 10 carbon atoms; preferably methyl; and
$X=$a halogen, preferably Cl.

The preferred compound is methyl chlorocyclopentane. It is interesting to note that chlorinated cyclopentane itself (i.e. no alkyl group) was totally ineffective as a catalyst modifier.

The mole ratio of alkyl compound to metal halide in the catalyst should be in the range of 0.1 to 5.0, preferably 0.5 to 0.9. The quantity of alkyl halocyclopentane to the group I to II metal alkyl compound must be less than one mole of halocyclopentane per mole of alkyl radical in the metal alkyl compound, and in general runs from 0.05 to 0.99 moles.

The monomer employed must be ethylene since higher alpha olefins such as propylene were found to give unsatisfactory low viscosity index-high viscosity oils.

The reaction is carried out at atmospheric pressure at a temperature of from about 0 to 130° F., preferably 30 to 120° F. in the presence of an aliphatic, cycloaliphatic, or aromatic hydrocarbon, preferably methylcyclopentane. The lower the temperature of reaction, the less the formaiton of solid by-products. Examples of suitable diluents that can be employed are the paraffins, such as n-hexane, n-pentane, n-heptane, iso-heptane, n-decane, and the like, unsubstituted or alkyl substituted cycloalkyl hydrocarbons and aromatic hydrocarbons such as benzene, toluene, xylene, naphthalene, and the like. Any diluent of the above type which is liquid under the reaction conditions can be employed. However, it must be remembered that when an aromatic diluent is used the telomerization reaction of the invention will take place with it, and accordingly, unless a mixture of polyalkylated compounds having different aromatic nuclei is specifically desired, the aromatic diluent should be the same as the aromatic hydrocarbon reactant, i.e. the aromatic hydrocarbon reactant can also be employed in larger quantities to serve as a diluent for the reaction. The quantity of diluent employed is not important although a diluent to total products ratio of from 0.4 to 9.5 (vol./wt.) is usually employed.

The above reaction temperature is not critical although temperatures above 120° F. should not be used since such temperatures result in rapid deactivation of the telomerization catalyst. The pressure is normally atmospheric, or even subatmospheric although more elevated pressures can be used if desired, such as to keep a relatively low boiling diluent from vaporizing.

GENERAL PROCEDURE

About 900 cc. of dry solvent was put in the reactor, which was blanketed with dry nitrogen; the metal alkyl compound was dissolved in 100 cc. of solvent and the solution was introduced to the reactor through a pressure equalized funnel. The alkyl halocyclopentane was added prior to the addition of the metal halide compound, which was TiCl₄ in all of the examples.

The above system was stirred, usually for about 10 minutes, until it acquired a brownish color. At this stage, the aromatic telogen was added and immediately after this, ethylene was introduced at a rate of 1.75 to 1.90 g. per minute. In some cases, a small amount of nitrogen was bubbled into the system to prevent suction due to the high rate of adsorption of ethylene. After the completion of the reaction, the system was blanketed with nitrogen, and a small amount of alcohol, followed by a large amount of water, were added to destroy the catalyst. The reaction mixture was washed with an equal amount of water in a separating funnel. The hydrocarbon phase was filtered to remove traces of solid materials, if any, and then stripped, to remove light materials of up to 700° F. n.b.p., or distilled in a 15/5 column and high vacuum to separate light and heavy fractions.

*Table I*

TELOMERIZATION REACTIONS OF ETHYLENE WITH LOWER AROMATICS

| | I | II | III | IV | V | VI | VII | VIII |
|---|---|---|---|---|---|---|---|---|
| Reactants: | | | | | | | | |
| Ethylene, g | | 91 | 248 | 105 | 128 | 105 | 92 | 110 |
| Aromatic telogen | | | | | | | | |
| Type | None | $C_6H_6$ | $C_6H_5$–$CH_3$ | $C_6H_5$–$CH_3$ | $C_6H_5$–$CH_3$ | $C_6H_6$ | $C_6H_6$ | $C_6H_6$ |
| Amount, g | | 110 | 135 | 108 | 108 | 110 | 110 | 110 |
| Catalyst: | | | | | | | | |
| Metal alkyl compound: | | | | | | | | |
| Type | $EtAlCl_2$ | $Et_2AlCl$ | $EtAlCl_2$ | $EtAlCl_2$ | $EtAlCl_2$ | $EtAlCl_2$ | $EtAlCl_2$ | $EtAlCl_2$ |
| Amount | 28 | 14 | 28 | 28 | 28 | 28 | 28 | 28 |
| Alkyl aluminum/TiCl₄, mol. ratio | 1.22 | .35 | .69 | .69 | 1.61 | .69 | .69 | .69 |
| Methyl chlorocyclopentane, g | 0 | 0 | | | | | | |
| Metal alkyl methylchlorocyclopentane, mol. ratio | | | 1.74 | 1.74 | 1.74 | 1.74 | 1.74 | 1.74 |
| Solvent: | | | | | | | | |
| Type | ¹n=$C_7$ | MCP | ¹MCP | MCP | MCP | MCP | MCP | MCP |
| Amount, cc | 900 | 1000 | 1000 | 1000 | 1000 | 1000 | 900 | 1000 |
| Conditions: | | | | | | | | |
| Reaction temp., °F | 54 | 77 | 75 | 52 | 65 | 70 | 48 | 124 |
| Reaction time, min | 138 | 50 | 80 | 60 | 73 | 60 | 50 | 60 |
| Ethylene rate of charge, g./min | ²1.75 | 1.82 | ²1.75 | ²1.75 | ²1.75 | ²1.75 | 1.83 | 1.83 |
| Total ethylene adsorption, g | | 91 | | 75 | 60 | 105 | 92 | 110 |
| Products: | | | | | | | | |
| Light materials, g | 18 | | 15 | | | | | |
| Oil, g.³ | 160 | 45 | 207 | 82 | 57 | 107 | 89 | 87 |
| Solids, g | ⁴Trace | 42 | Trace | Trace | Trace | Trace | Trace | Trace |
| Inspections of the oil: | | | | | | | | |
| Vis. SUS at 210° F | 65 | | | 49 | 44 | 50 | 49 | 39 |
| V.I. | 129 | | | 120 | 130 | 133 | 125 | 128 |
| Pour point, °F | +50 | +90 | | −25 | +55 | +5 | | |
| Silica gel aromatics, weight percent | | | 27.8 | 36.4 | 31.7 | 17.5 | | |
| Bromine number | | | | | | | | |
| Hivac bottoms, weight percent | 55 | | | | | | | |
| Dewaxing:⁶ | | | | | | | | |
| Wax, weight percent | 90 | | | | | 3 | | |
| Inspections of the oil: | | | | | | | | |
| Vis. SUS at 210° F | | | 60 | | | | | |
| V.I. | | | 117 | | | | | |
| Pour point, °F | | | −20 | | | | | |

| | IX | X | XI | XII | XIII | XIV | XV | XVI | XVII |
|---|---|---|---|---|---|---|---|---|---|
| Reactants: | | | | | | | | | |
| Ethylene, g | 92 | 95 | 90 | 90 | 92 | 95 | 536 | 93 | 92 |
| Aromatic telogen | | | | | | | | | |
| Type | $C_6H_6$ | $C_6H_6$ | $C_6H_6$ | $C_6H_6$ | $C_6H_6$ | $C_6H_6$ | $C_6H_6$ | $C_6H_6$ | $C_6H_6$ |
| Amount, g | 110 | 110 | 800 | 110 | 110 | 110 | 165 | 110 | 110 |
| Catalyst: | | | | | | | | | |
| Metal alkyl compound: | | | | | | | | | |
| Type | $EtAlCl_2$ | $Et_2AlCl$ | $Et_2AlCl$ | $Et_3Al$ | $Et_3Al$ | $Et_3Al$ | $EtAlCl_2$ | $Et_3Al$ | $Et_3Al$ |
| Amount | 28 | 14 | 14 | 7.7 | 7.7 | 7.7 | 7 | 7.7 | 7.7 |
| Alkyl aluminum/TiCl₄, mol. ratio | .69 | .35 | .35 | .206 | .206 | .206 | .69 | .393 | 1.77 |
| Methyl chlorocyclopentane, g | | | | | | | | | |
| Metal alkyl methylchlorocyclopentane, mol. ratio | 1.74 | .91 | .91 | .52 | .52 | .52 | 1.74 | .52 | .52 |
| Solvent: | | | | | | | | | |
| Type | n=$C_7$ | MCP | None | n=$C_7$ | ¹n=$C_7$ | ¹MCP | MCP | n=$C_7$ | n=$C_7$ |
| Amount, cc | 1000 | 1000 | | 1000 | 1000 | 1000 | 1000 | 1000 | 1000 |
| Conditions: | | | | | | | | | |
| Reaction temp., °F | 71 | 71 | 70 | 124 | 60 | 71 | 70 | 70 | 70 |
| Reaction time, min | 50 | 50 | 50 | 50 | 50 | 50 | 293 | 50 | 50 |
| Ethylene rate of charge, g./min | 1.83 | 1.89 | 1.81 | 1.81 | ²1.83 | 1.89 | 1.83 | 1.85 | ²1.83 |
| Total ethylene adsorption, g | 92 | 95 | 90 | 90 | 92 | 95 | | 93 | |
| Products: | | | | | | | | | |
| Light materials, g | | | | | | | | | |
| Oil, g.³ | 91 | 90 | 78 | 64 | 81 | 85 | 384 | 90 | 62 |
| Solids, g | Trace | Trace | Trace | 12 | ⁴Trace | Trace | 7 | Trace | Trace |
| Inspections of the oil: | | | | | | | | | |
| Vis. SUS at 210° F | 65 | ⁵66 | ⁵66 | 40 | 62 | 53 | 52 | 63 | |
| V.I. | 118 | 123 | 89 | 140 | 131 | 136 | 136 | 130 | |
| Pour point, °F | −20 | +25 | −30 | +70 | +25 | +35 | | +35 | |
| Silica gel aromatics, weight percent | | | | | | | | | |
| Bromine number | | | | | | | | | |
| Hivac bottoms, weight percent | | | | | | | | | |
| Dewaxing:⁶ | | | | | | | | | |
| Wax, weight percent | | | | | | 9 | 9.8 | 11 | 3.2 |
| Inspections of the oil: | | | | | | | | | |
| Vis. SUS at 210° F | | | | | | 53 | 51 | 62 | 50 |
| V.I. | | | | | | 132 | 133 | 129 | 121 |
| Pour point, °F | | | | | | −5 | −5 | −5 | |

¹ n=$C_7$ for n-Heptane; MCP for methylcyclopentane.
² Approximate value.
³ Stripped to 700° F. I.B.P.
⁴ Less than .5% on total products.
⁵ Stripped to 700° F. vapour temperature.
⁶ At −10° F., using 2+1 vol. of methylisobutylketone.

Table II
PROPERTIES OF DISTILLATION CUTS (Example III)

| Weight percent on total charge | Atm. vapor temp., °F | Aromatics,[1] weight percent | V-210 | V.I. | Dewaxing at −10° F wax, weight percent |
|---|---|---|---|---|---|
| 7.9 15/5 distillation | 250/467 | | | | |
| 10.2 | 467/729 | | | | |
| 10.2 | 729/803 | | 35.8 | 81 | |
| 10.2 | 803/888 | 45.7 | | | |
| 10.2 | 888/953 | | 49.4 | 113 | |
| 9.8 | 953/1,004 | 21.7 | | | |
| 9.8 H.V. distillation | 1,004/1,039 | | [2] 69.7 | [2] 112 | 28 |
| 10.2 | 1,039/1,080 | 10.2 | | | |
| 9.8 | 1,080/1,100 | | [2] 91.9 | [2] 121 | 50 |
| 10.6 | 1,100/1,132 | 10.0 | | | |
| 2.8 | 1,132+ | | | | |

[1] Silica gel (Humble short cut method).
[2] After dewaxing at −10° F.

The above oils of Examples III–XVII of Table I were subjected to nuclear magnetic resonance and mass spectroscopic analyses, and the oils were found to be highly alkylated benzenes. The average molecule in them showed that the benzene nucleus was substituted at from 3.7 to 5.2 points, by straight chains of from 3.6 to 9.5 carbon atoms in average length. Examples I and II were included for comparison purposes. Example I shows the polymerization of ethylene in the absence of an aromatic telogen and methyl chlorocyclopentane. The product of this run was about 90% wax. Example II shows the polymerization of ethylene in the presence of an aromatic telogen but in the absence of methyl chlorocyclopentane. The product of this run contained almost 50% solids which, of course, are of no use as lubricating oils and must be separated from the oil fraction.

It can also be seen from the above examples that the process of the invention provides a simple direct method for preparing high viscosity index lubricating oils from simple and inexpensive starting materials. Additionally, lube oils of any desired structure can be prepared by employing suitable multiple ring aromatic starting materials. A further important advantage of the products of the invention is their freedom from trace impurities such as sulfur and nitrogen compounds, normally encountered in petroleum fractions.

Modifications of the process of the invention can be made without departing from the scope and spirit of the instant invention.

What is claimed is:

1. The process of preparing a polyalkylated aromatic hydrocarbon comprising the steps of reacting an aromatic hydrocarbon with ethylene in the presence of a minor amount of a 3-component catalyst comprising (1) an alkyl compound of a metal of groups I–III of the periodic table, (2) a halide of a metal of groups IV–B, V–B, VI–B and VIII of the periodic table, and (3) an alkyl halocyclopentane wherein the alkyl group contains from 1–10 carbon atoms, in an inert hydrocarbon diluent in the range of 0 to 130° F.; the quantity of alkyl halocyclopentane being less than one mole per mole of alkyl radical of catalyst component (1).

2. The process of claim 1 wherein catalyst component (1) is an alkyl aluminum compound.

3. The process of claim 2 wherein catalyst component (2) is a titanium halide.

4. The process of claim 3 wherein catalyst component (3) is methylchlorocyclopentane.

5. The process of preparing a polyalkylated aromatic hydrocarbon comprising the steps of reacting an aromatic hydrocarbon with ethylene in the presence of a 3-component catalyst comprising (1) titanium tetrachloride, (2) an alkyl aluminum compound and (3) methylchlorocyclopentane in an inert hydrocarbon diluent at a temperature in the range of 0–130° F.; the quantity of halocyclopentane being less than one mole per mole of alkyl radical of catalyst component (2).

6. The process of claim 5 wherein the temperature is in the range of 30 to 120° F.

7. The process of claim 5 wherein the hydrocarbon diluent is methylcyclopentane.

8. The process of claim 1 wherein the ratio of catalyst component (1) to catalyst component (2) is in the range of 0.1 to 5.0.

References Cited in the file of this patent
UNITED STATES PATENTS

| | | |
|---|---|---|
| 2,824,145 | McCall et al. | Feb. 18, 1958 |
| 2,907,805 | Bestain et al. | Oct. 6, 1959 |
| 2,935,542 | Minckler et al. | May 3, 1960 |
| 2,969,408 | Nowlin et al. | Jan. 24, 1961 |
| 2,993,942 | White et al. | July 25, 1961 |